Patented Dec. 13, 1932

1,890,711

UNITED STATES PATENT OFFICE

JOHANNES WOLLEMANN, OF OFFENBACH-ON-THE-MAIN, GERMANY, ASSIGNOR TO GENERAL ANILINE WORKS, INC., OF NEW YORK, N. Y., A CORPORATION OF DELAWARE

PROCESS FOR THE MANUFACTURE OF 6-BROMO-2-HYDROXY-NAPHTHALENE AND ITS SUBSTITUTION PRODUCTS

No Drawing. Application filed October 26, 1931, Serial No. 571,276, and in Germany November 1, 1930.

My present invention relates to an improved process for the manufacture of 6-bromo-2-hydroxy-naphthalene and its substitution products.

In German Specification No. 396,519 is described the manufacture of 6-halogen-2-hydroxy-3-naphthoic acid by treating 1.6-dihalogen-2-hydroxy-3-naphthoic acid with a tin salt in alcoholic solution, that is to say in a manner analogous to the manufacture of 6-bromo-2-naphthol described by Franzen and Stäuble (Journ. für prakt. Chemie, new edition, volume 103, page 369).

My present process, which avoids the use of the expensive tin compounds, comprises heating a hydroxynaphthalene compound of the general formula:

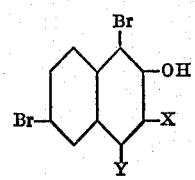

wherein X means hydrogen or the group COO-alkali metal, Y means hydrogen or bromine and at least one of X and Y is hydrogen, with an alkali metal sulfite.

Thereby the bromine atom standing in 1-position is removed and 6-bromo-2-hydroxy-naphthalene and its substitution products are obtained with an excellent yield. These products correspond to the general formula:

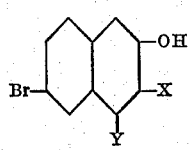

wherein X means hydrogen or a carboxylic acid group, Y means hydrogen or bromine and at least one of X and Y is hydrogen.

In order to further illustrate my invention the following examples are given, the parts being by weight and all temperatures in centigrade degrees. But I wish it to be understood that my invention is not limited to the particular conditions or specific products mentioned therein.

*Example 1*

100 parts of 1.6-dibromo-2-hydroxy-naphthalene-3-carboxylic acid are made to a paste by means of 1500 parts of hot water and converted into the monosodium salt by the addition of 20 parts of calcined soda. After the evolution of carbon dioxide 100 parts of crystallized neutral sodium sulfite and 25 parts of soda (calcined) are added and the whole is heated in an autoclave for 8 hours to 150°. When the reaction liquid is cold, the formed precipitate is filtered, dissolved in 3000 parts of boiling water and acidified by 95 parts of 20° Bé. hydrochloric acid. The free 6-bromo-2-hydroxy-naphthalene-3-carboxylic acid thus formed is filtered, washed and dried. It melts at 262° and corresponds to the formula:

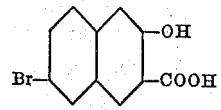

*Example 2*

A solution of 68.8 parts of 1.6-dibromo-2-hydroxy-naphthalene-3-carboxylic acid in 20 parts of calcined soda and 6000 parts of water is mixed with a solution of 60 parts of crystallized neutral sodium sulfite. Then the whole is boiled under a reflux condenser for 36 hours, while gradually, that is after 12, 24 and 30 hours, again 10 parts each of crystallized sodium sulfite are added. The formed 6-bromo-2-hydroxy-naphthalene-3-carboxylic acid is precipitated with hydrochloric acid, filtered, washed with water and dried. It is identical to the compound of Example 1.

The reaction may be likewise carried out by means of potassium sulfite and a monoalkali metal salt of 1.6-dibromo-2-hydroxy-naphthalene-3-carboxylic acid.

*Example 3*

A mixture of 363 parts of 1.6-dibromo-2-hydroxy-naphthalene, 1200 parts of alcohol, 624 parts of a potassium sulfite solution corresponding to 272 parts of $K_2SO_3$ and 600 parts of water is boiled under a reflux condenser for 12 hours. The alcohol is distilled off, the formed 6-bromo-2-hydroxy-naphthalene is filtered when cool, freed from inorganic salts by washing with water and dried.

By using sodium sulfite instead of potassium sulfite the reaction runs more slowly and takes about 30 hours.

Also by boiling the sodium salt of 1.6-dibromo-2-hydroxy-naphthalene with an aqueous sodium sulfite solution under a reflux condenser, 6-bromo-2-hydroxy-naphthalene is obtained.

*Example 4*

A mixture of 190.5 parts of 1.4.6-tribromo-2-hydroxy-naphthalene, 800 parts of alcohol, 260 parts of 43.6% potassium sulfite solution and 250 parts of water is boiled under a reflux condenser for 12 hours. Then the alcohol is distilled off and the residue is diluted with 750 parts of hot water. The mass is stirred until cool, the precipitated product is filtered, washed with water and dried. The 4.6-dibromo-2-hydroxy-naphthalene thus obtained melts at 134° and corresponds to the formula:

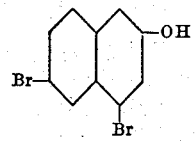

I claim:
1. Process which comprises heating a hydroxynaphthalene compound of the general formula:

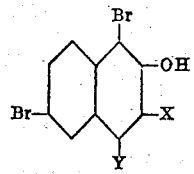

wherein X means hydrogen or the group COO-alkali metal, Y means hydrogen or bromine and at least one of X and Y is hydrogen, with an alkali metal sulfite.

2. Process which comprises heating 1.6-dibromo-2-hydroxy naphthalene of the formula:

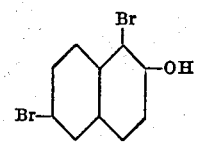

with an alkali metal sulfite.

3. Process which comprises heating an alkali metal salt of 1.6-dibromo-2-hydroxy-naphthalene-3-carboxylic acid of the formula:

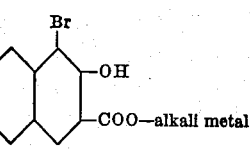

with an alkali metal sulfite.

4. Process which comprises heating 1.4.6-tribromo-2-hydroxynaphthalene of the following formula

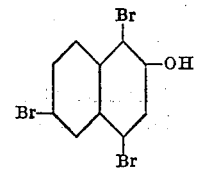

with an alkali metal sulfite.

In testimony whereof, I affix my signature.

JOHANNES WOLLEMANN.